United States Patent [19]
Velazquez

[11] Patent Number: 5,332,255
[45] Date of Patent: Jul. 26, 1994

[54] FRONT SUSPENSION ASSEMBLY

[75] Inventor: Alfonso Velazquez, Hidalgo, Mexico

[73] Assignee: Dina Autobuses, S.A. De C.V., Mexico City, Mexico

[21] Appl. No.: 871,797

[22] Filed: Apr. 20, 1992

[30] Foreign Application Priority Data

Apr. 19, 1991 [MX] Mexico .................................. 25447

[51] Int. Cl.$^5$ .............................................. B60G 3/00
[52] U.S. Cl. .................................... 280/700; 267/189;
267/276; 267/278; 267/281; 280/661
[58] Field of Search ............... 280/661, 700, 723, 721;
267/276, 277, 278, 191, 188, 189, 273, 279, 281

[56] References Cited

U.S. PATENT DOCUMENTS

| | | | |
|---|---|---|---|
| 2,855,212 | 10/1958 | Houser | 280/721 |
| 2,942,871 | 6/1960 | Kraus | 280/721 |
| 3,601,424 | 8/1971 | Badland | 280/717 |
| 4,243,247 | 1/1981 | Kataoka | 280/723 |
| 4,778,199 | 10/1988 | Haggerty et al. | 280/721 |
| 5,104,142 | 4/1992 | Tsubota et al. | 280/661 |

FOREIGN PATENT DOCUMENTS

| | | | |
|---|---|---|---|
| 2445825 | 4/1975 | Fed. Rep. of Germany | 267/273 |
| 857570 | 12/1960 | United Kingdom | 267/273 |

*Primary Examiner*—Eric Culbreth
*Attorney, Agent, or Firm*—Roylance, Abrams, Berdo & Goodman

[57] ABSTRACT

A heavy duty front suspension system especially for passenger buses includes square rubber torque springs supported by a spring frame assembly. The spring support frame includes a lower support having transverse reinforcement gusset plates extending at an angle from the frame assembly to enable the frame and torque spring support the loads transmitted by the bus and to withstand the variations in the road surface. The torque spring includes a hexagonal block on each end of the tubular shaft for removably mounting an adjustment lever to transmit the tension stresses to the spring. Each adjustment level has an eyelet connected to adjustable tension bars extending to a mounting bases which are anchored to the structural cross members of the bus body. A yoke element is firmly fixed to a trunnion that forms part of the spring frame assembly. A lower end of the yoke has an extension with a conical hole to fasten a shock absorber assembly. The upper end of the yoke is joined with an upper control arm by means of a lower arm bolt that goes through orifices in such yoke and the arm joint. A central transverse orifice is provided in the arm joint to support the trunnion of the wheel. The upper end of the joint is connected with the upper command arm in the form of an "H". The opposite end of the control arm is joined to an upper support by rubber torque bushings. The upper supports are fixed to the side rail of the bus by a mounting plate.

18 Claims, 9 Drawing Sheets

FIG. 3
PRIOR ART
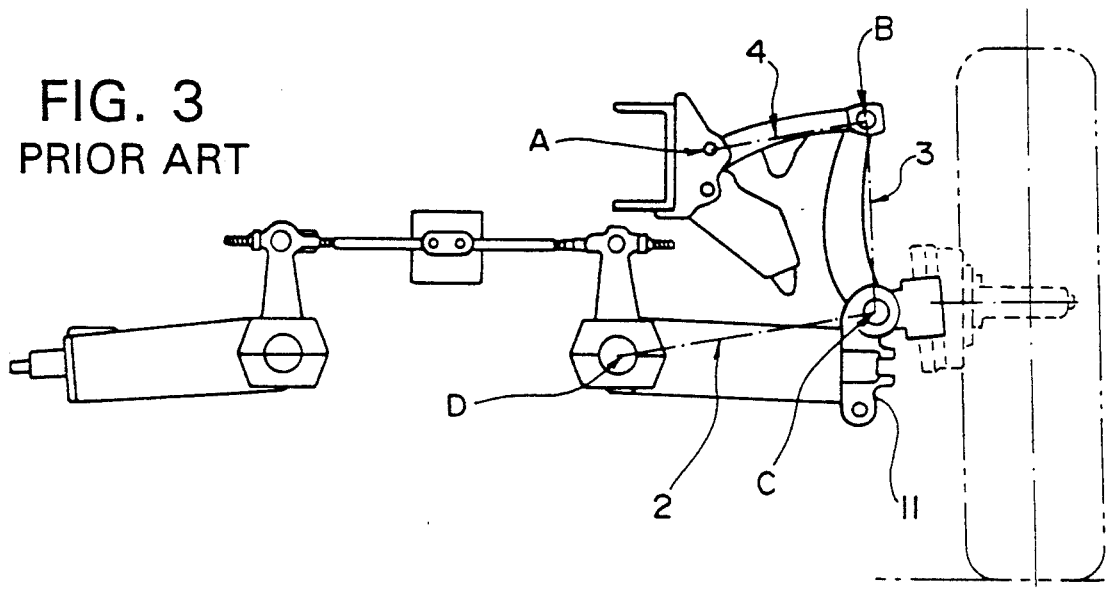
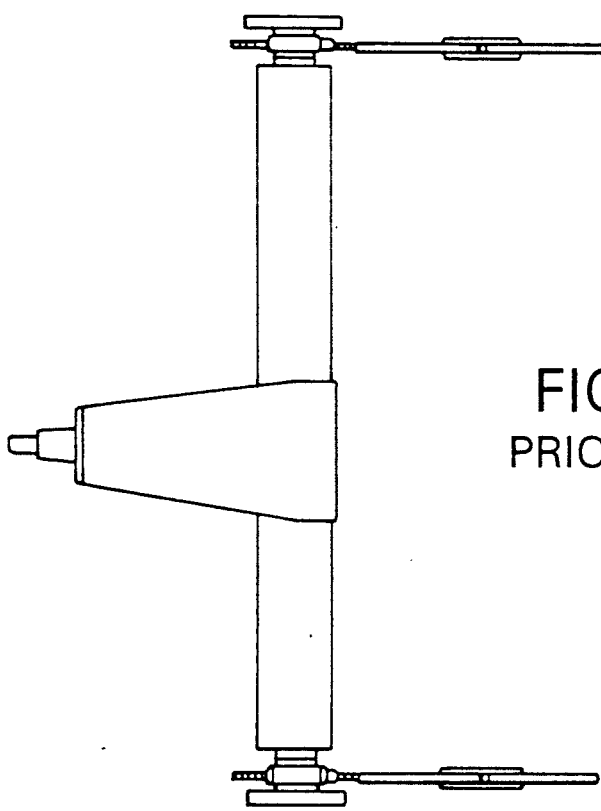
FIG. 4
PRIOR ART

FRONT SUSPENSION ASSEMBLY

FIELD OF THE INVENTION

The present invention is directed to a front torsion spring suspension assembly. More particularly, the invention relates to a suspension assembly having an adjustable rubber torsion spring coupling the assembly to the vehicle frame.

BACKGROUND OF THE INVENTION

The conventional front suspension system used by bus manufacturers is generally of the independent type, such that shocks and vibrations received by one wheel are not transmitted to the other wheel. The suspension system consists of a frame type mechanism with four articulated bars or links having a main rubber torque spring with a circular cross-section that forms one of the lower joints of the four bar mechanism.

For the purpose of illustrating the conventional suspension system, which is the object of the improvements of the new front suspension of the present invention, a conventional spring assembly is illustrated in FIGS. 1–4. FIGS. 1–4 are referred in a general way for the description of the background of the invention. FIG. 1 schematically shows the arrangement of the independent suspension having four articulated bars shown on each side of the suspension. As can be seen, the left side is symmetrical with the right. The frame or chassis of the vehicle is supported on bars 2 and 4 by means of the joints A and D, while the bar 3 is supported on bars 2 and 4 by means of joints B and C. Bar 3 is joined to the steering yoke where the wheel is mounted. In this suspension system, the joint D is constituted by the torque spring which supports the load of the bus.

FIGS. 2A and 2B illustrate the suspension of the prior art comprising the torque spring of the suspension that acts as a large dimension bushing that absorbs the vibration and noise of the wheels, preventing the vibrations from reaching the body to provide the bus with a comfortable ride. The conventional torque spring assembly 5 is formed by a cylindrical, molded rubber body 6 vulcanized on a steel pipe 7. Steel sheet casings 8 are mounted on the exterior of the rubber body 6, as shown in FIG. 2A. To carry out the spring functions, the spring is pressure inserted into a pipe 9 having an arm 15 welded thereon for mounting the spring assembly to the suspension system of the vehicle. The spring assembly 5 is previously torqued such that it is able to support the loads submitted by the weight of the bus. An adjustment lever 10 is welded at each end of the steel pipe 7 prior to assembling into the pipe for adjusting the torque of the spring. FIG. 2B illustrates the spring assembly 5 in the assembled condition. The tension of the spring and arm assembly supporting the loads of the bus suspension traveling on the highways can thus be set. The ends of the pipe 7 of the spring and arm assembly are fixed to the frame with two supports that constitute the points where the frame is supported on the suspension.

It is an inherent characteristic of the rubber torque spring that with use it relaxes, such that the load capacity of the spring is partially lost, and the height of the bus with respect to the ground is reduced. When this happens, it becomes necessary to retighten the spring, by adjusting the position of adjustment levers 10 with respect to the chassis as indicated in FIG. 4.

The torque spring is designed to have a long useful life. However, it becomes necessary to replace the spring when it is impossible to retighten the spring, due to the great number of kilometers the bus travels during service.

A disadvantage of the prior art circular section torque spring is that to tighten this rubber spring body 6, the adjustment levers 10 must be removed and again welded on the shaft in another angular position. The welding typically burns the rubber of the spring thereby reducing the life of the spring. Further, to effect this operation, it is necessary to remove the spring and arm assembly from the bus.

Another disadvantage of the prior art spring and arm assembly of the conventional suspension is that when a spring's useful life has ended and must be replaced, special equipment is required to pull or push the rubber spring body under pressure from inside the pipe. This involves the need for a specialized machine shop to change the springs, resulting in considerable time and expense for maintenance.

To support the suspension assembly made up of the spring and arm in the wheels, there are four elements that allow the movement of each wheel independently and support the bus. One of these elements is a yoke 11 that together with the arm welded to the torsion spring pipe, form the link or bar 2 of the articulated four bar mechanism represented in FIG. 3. The yoke 11 is mounted on the arm 15 of the spring assembly via a welded conical trunnion 12 having a threaded end. The yoke includes a conical hole that is assembled on the trunnion and is fastened to the trunnion by means of a washer and nut. The yoke also includes a pair of bushings with different interior diameters for receiving a tapered bolt forming part of joint C.

Another support element of the spring and arm assembly consists in a vertical Joint arm, which in the diagram of FIGS. 1 and 3 constitutes bar 3, which serves to connect the bars 2 and 4 and to join the steering yoke.

The joint C constitutes the zone of greatest load and wear on the front suspension and therefore requires periodic lubrication. The Joint C is formed by a bolt with two different diameters on its ends and a conical middle section to firmly unite the bolt with a conical hole in the joint arm. The tightening of the bolt with respect to the bolt is done with a special thin nut that is arranged on one side of the joint arm in the middle part of the yoke. The relative movement of the elements occurs between the bolt and the yoke, which has a pair of bushings. The joint is typically lubricated by means of grease cups installed on both sides of the yoke so that the grease passes through a hole in the bolt of the joint and through transverse holes in such bolt, which empty into the space between the bushings and the contacting surfaces of the bolt.

The above-described assembly and lubrication system has the inconvenience of requiring special tools for tightening the bolt and for later disassembly to change bushings, since it is necessary to remove the bolt to access the bushings. The bolt extraction operation involves applying a load with an extractor on the end of the bolt and alternately loosening the thin nut provided in the middle of the yoke. The lubrication for this type of assembly tends to be deficient because a large part of the grease escapes through an end of the bolt while it is injected in the other end, and therefore in some cases the bushings remain unlubricated, resulting in premature wear of the bushings. The worn bushings which are not replaced can cause abnormal wear of the tires due to the loss of alignment caused by the excessive play between the bolt and the yoke bushings.

The conventional suspension system also has an upper control arm that through the joint A serves as a support for the body of the vehicle. The control arm is joined with the arm Joint at the point defined by joint A or joint B, where the elements of the front suspension are located in order to adjust the slope of the wheel.

Joint A of FIG. 1 is formed by two bolts that are fixed to two supports by means of screws that pass through a groove formed in the supports and a half-moon type chock. On each of these bolts are mounted two conical bushings opposing each other. Between the bushings is located one of the two parts that form the upper control arm in joint A. The ends of the bushing having opposing conical surfaces allow assembling of the bushings by means of a washer and a grooved cotter nut.

Joint A described above has the inconvenience of excessive wear in the bushings when correct alignment of the front wheels is not maintained, mainly due to the effect of an improper caster. When there is high wear of these bushings, there is also wear on the inner portion of the tires, which is quickly increased due to the loss of correct angle of the tire as a result of the excessive play between the bushings and the bolts.

Another characteristic of the front suspension presently in use is that it has two shock absorbers, one for each spring, whose main function is to control the movements of the wheel. The shock absorbers allow only a certain number of vertical movements that are diminished by the action of the shock absorber and controls the speed and number of lateral movements of the bus. Due to the increased height of the bus, a common report is the presence of excessive lateral and longitudinal movements that make control of the vehicle difficult on mountainous roads, attributed to deficiency of the shock absorber system.

Since the conventional rubber torque spring by itself does not have the sufficient capacity to support the load of the bus and of the people and baggage it transports, the known suspension system has to be complemented with an auxiliary suspension of air chambers and a pneumatic system for air feed and control of such chambers. The pneumatic system increases the weight which must be supported by the suspension system.

Even when the round section rubber torque spring suspension provides a comfortable and safe suspension system, problems in regard to fast, easy, lasting maintenance and load capacity of the system typically occur.

SUMMARY OF THE INVENTION

The main object of the invention is to provide a front suspension system of the independent type for vehicles, and particularly buses, which incorporate innovations that make it possible to solve the disadvantages of conventional suspensions.

One object of the new front suspension is to increase its load capacity by a substantial percentage in comparison with previous models.

Another object of the improved front suspension is to increase the useful life of such suspension by an average of up to 40% with respect to known suspension systems.

A further object of the invention is to provide an improved suspension system where all of the components are easily and quickly assembled and mounted, and do not require special machines and tools for assembly.

An additional object of the improved suspension is the large reduction in time and maintenance operations, service and replacement of parts, which results in less down time in the bus service, a situation which is very important economically for companies that provide passenger transport.

Another object of the improved front suspension is to provide the bus with greater comfort, stability and safety with the incorporation of two additional shock absorbers in such suspension.

Another object of the invention is to provide a front suspension assembly which eliminates the need for an auxiliary air chamber suspension and allows standardization of parts.

A further object of the invention is to facilitate maintenance and increase the useful life of the suspension components by providing a unique bolt arrangement for the yoke.

An additional object of the improved suspension is to allow the torque springs to be retightened without affecting the elastic properties of such suspension, whereby the spring has a longer useful life.

The above-noted objects are basically attained by an independent front suspension assembly for vehicles comprising a lower frame support pivotally coupled to a vehicle frame at a first end of said frame support; a yoke coupled to a second end of said frame support; a vertical arm pivotally coupled to said yoke at a lower end of said vertical arm; an upper control arm pivotally coupled at a first end to an upper end of said vertical arm and pivotally coupled at a second end to said frame; a torsion spring assembly comprising an inner tubular shaft, a rubber torsion spring body fixed to said tubular shaft and spaced from ends of said shaft, an outer sheath having a substantially square cross section, a hexagonal lug fixed to each end of said tubular shaft, a removable tension adjustment lever removably coupled to each of said lugs, said outer sheath being clamped to said first end of said frame support and said tubular shaft being removably coupled to said frame, and an adjustable tension bar coupled to said adjustment lever and to said frame to adjust the angular position of said tubular shaft with respect to said frame; said yoke having a pair of spaced apart arms extending from an upper end of the yoke, each of said arms having a transverse aperture coaxially aligned, said lower end of said vertical arm having a conical aperture therein and being disposed between said arms of said yoke, bolt means extending through said apertures in said arms of said yoke and said conical aperture in said vertical arm, said bolt means having first and second cylindrical sections complementing an inner surface of each aperture in said arms of said yoke and a conical shaped section disposed between said first and second sections complementing said conical aperture in said vertical arm, said first cylindrical section of said bolt having a diameter larger than a diameter of said second cylindrical section; said yoke further comprising a lower extension; shock absorber means having a lower end coupled to said extension of said yoke and an upper end coupled to said frame; and said second end of said upper control arm being coupled to a rubber torsion bushing, said rubber torsion bushing comprising a central shaft, a vulcanized rubber torsion body fixed to said shaft, and an outer casing fixed to said rubber torsion body and being fixed to said vehicle frame.

The above objects and other additional advantages of the invention will be evidenced in the following detailed description related for better understanding of the drawings of the front suspension which also form part of this description.

BRIEF DESCRIPTION OF THE DRAWINGS

FIG. 3 is a side view, equivalent to the schematic representation of FIG. 1, of the conventional rubber torque spring suspension assembly of the prior art.

FIG. 4 is an upper plan view of the prior art circular section rubber torque spring.

DETAILED DESCRIPTION OF THE INVENTION

Figure 1:
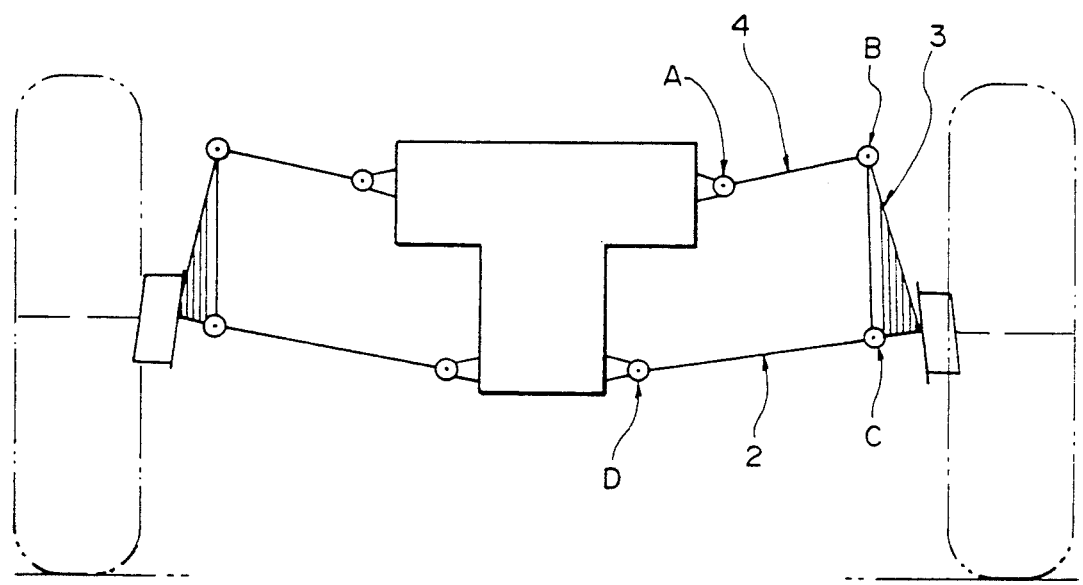
FIG. 1 is a schematic representation of the prior art independent front suspension system.
Figure 2A:
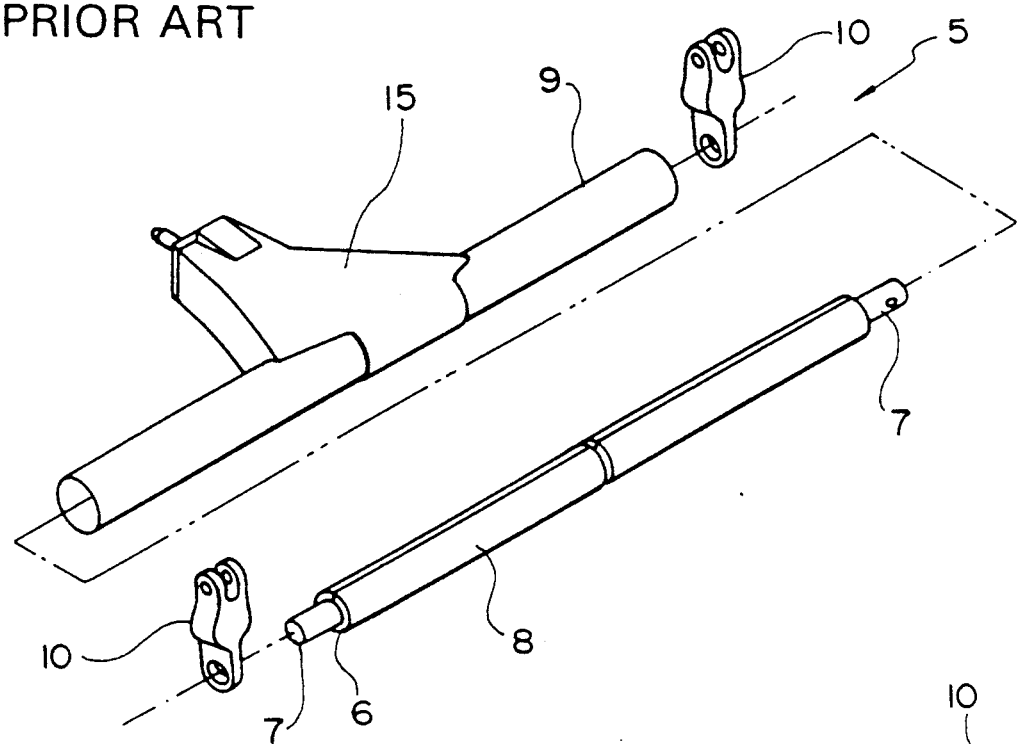
FIG. 2A illustrates a spring with an integrated arm and adjustment levers welded to the ends, characteristic of the prior art engineering. This circular torsion spring is a circular section and is shown in the disassembled in FIG. 2A and in the assembled condition in FIG. 2B.
Figure 2B:
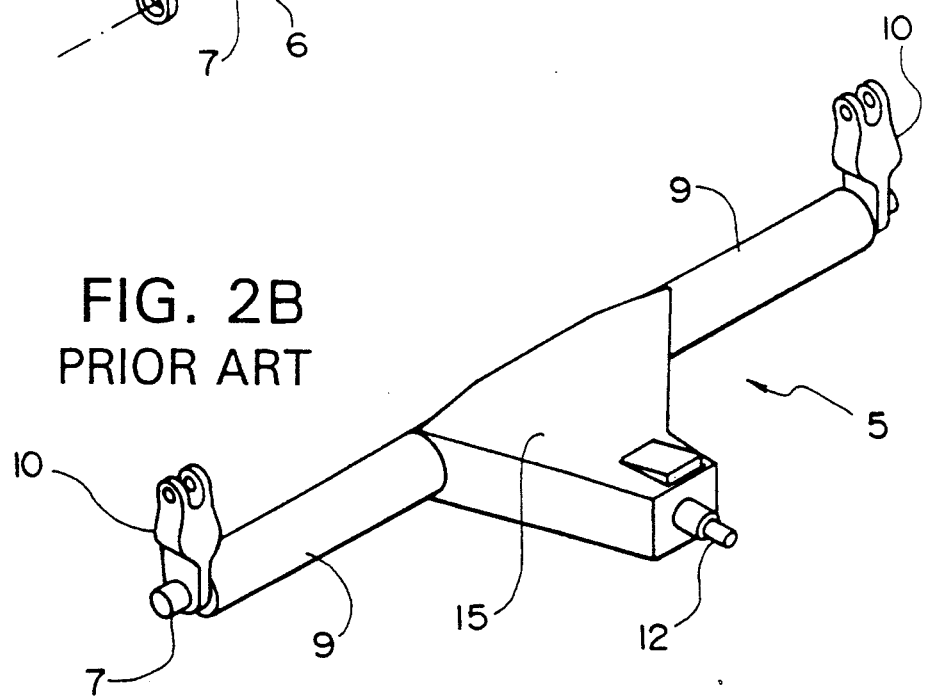
Figure 5:
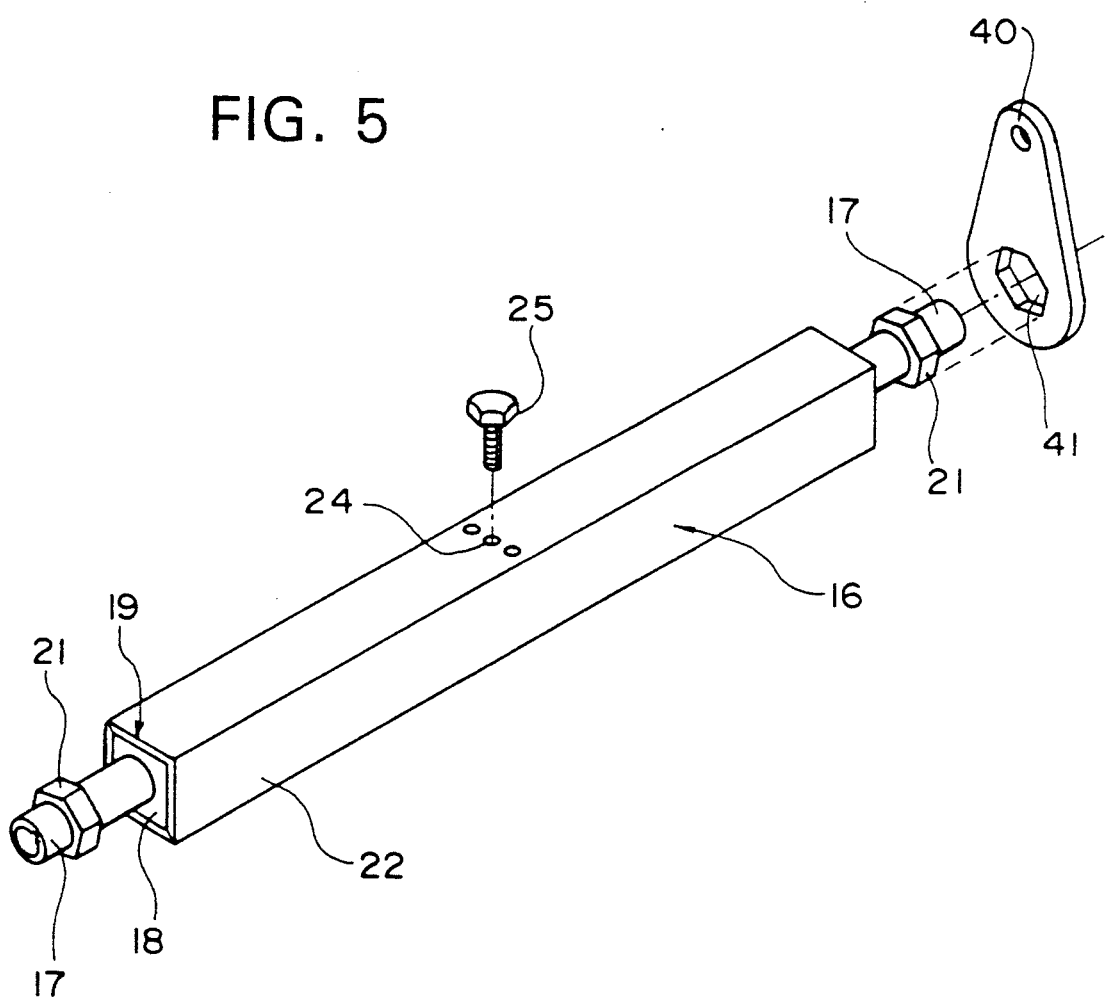
FIG. 5 is a perspective view of the square torsion spring assembly.
Figure 6:
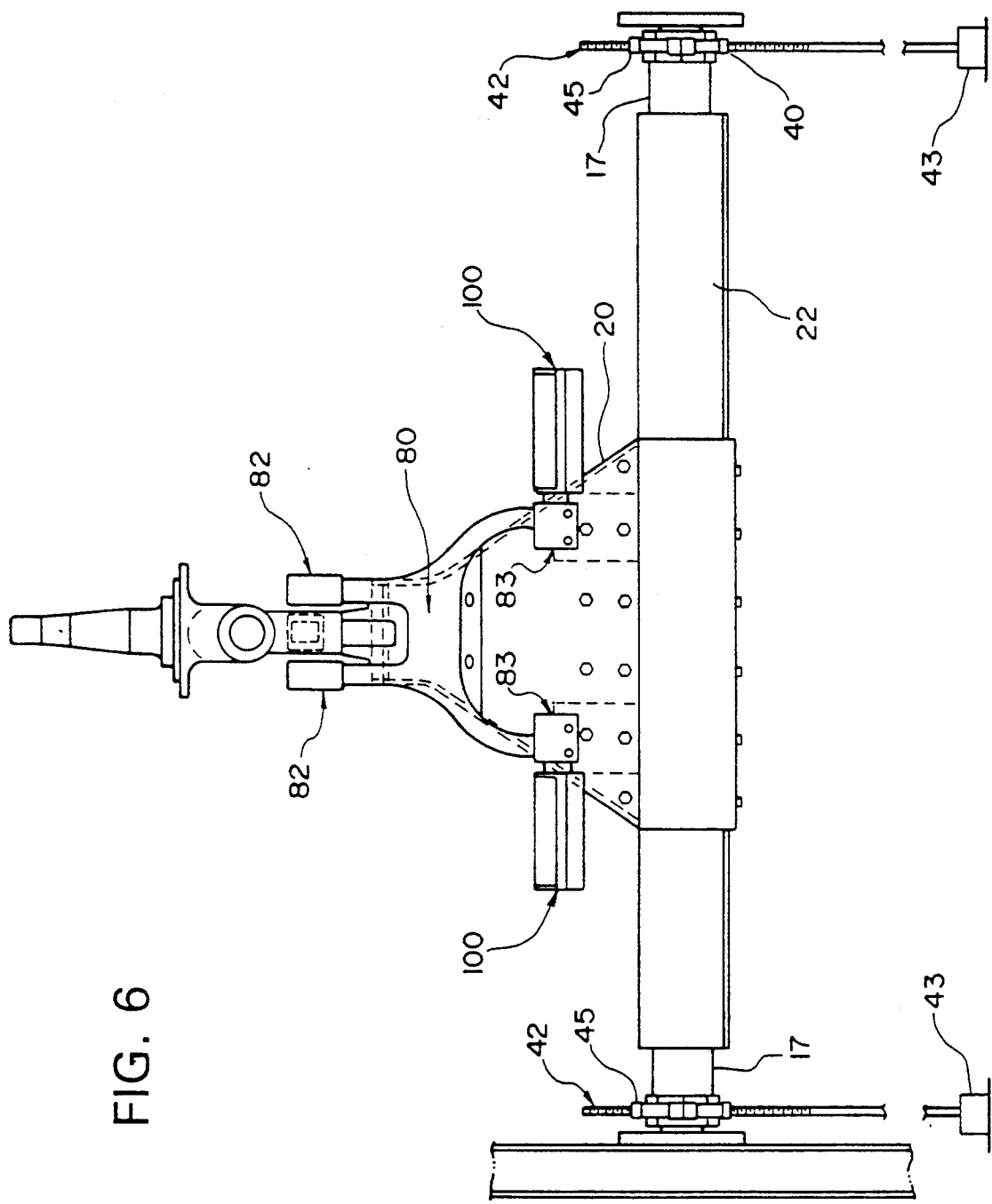
FIG. 6 is an upper plan view of a preferred embodiment of the independent front suspension in accordance with the invention.
Figure 7:
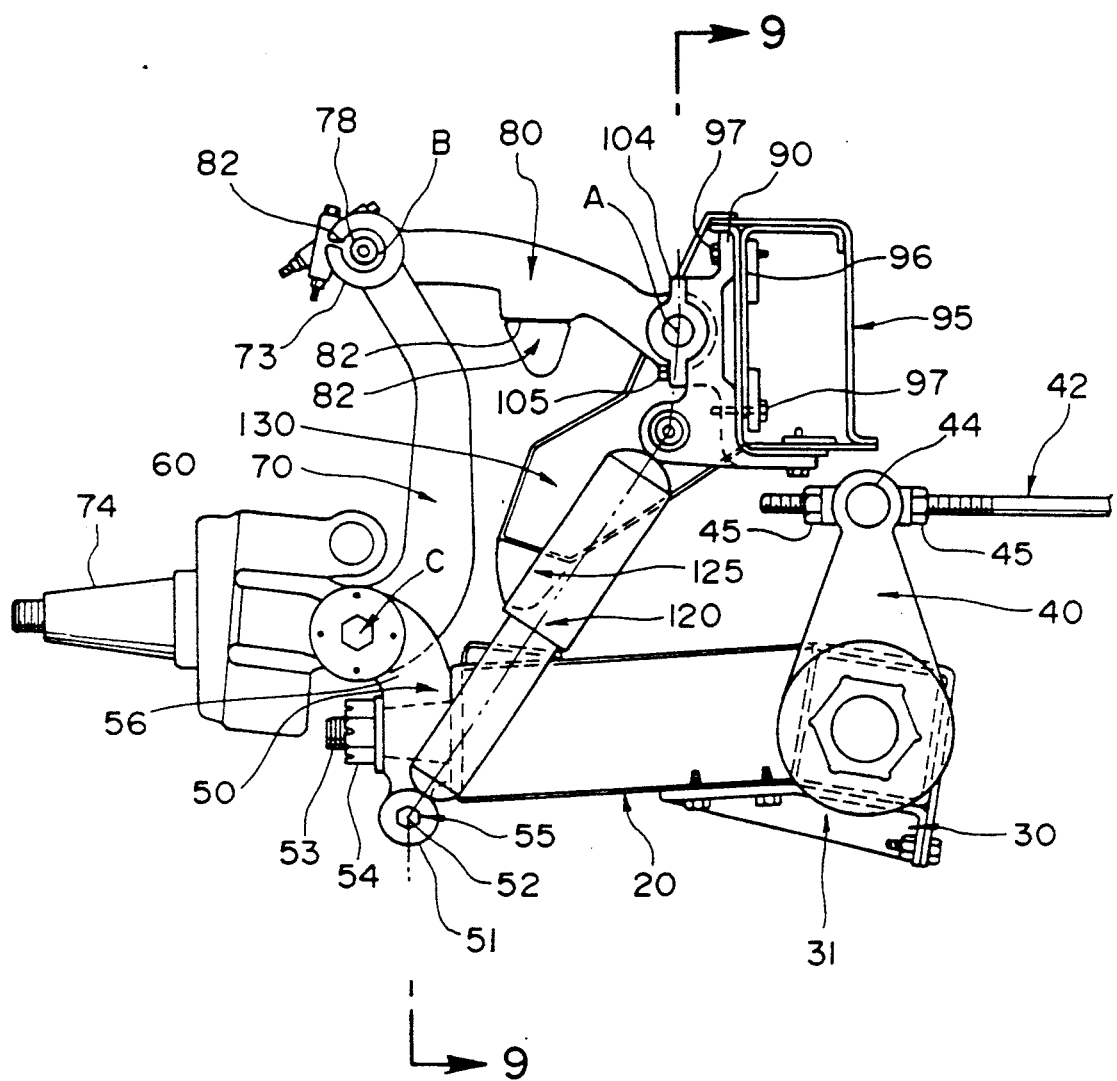
FIG. 7 is a side view of the heavy duty improved suspension of the invention.

The suspension assembly according to the invention is provided with a square rubber torque spring assembly 16 represented in complete form in perspective, side and end views in FIGS. 5, 6 and 7, respectively. A primary purpose of the invention is to make maintenance of the suspension more efficient, reduce premature wear and tear of some of the components, provide greater load capacity and increase the comfort and safety of the vehicle operation in general.

Circular rubber torsion springs are known and have been produced by B. F. Goodrich. As shown in FIG. 5, the square spring assembly 16 of the invention is formed by a round steel section tubular core or shaft 17 on which is vulcanized a rubber cover or spring rubber body 18. The spring rubber body 18 is formed from a high torque resistance composition. The rubber body 18 has a square exterior cross-section and four steel sheet angles 19 adhered to the outer face of the vulcanized rubber body 18. The steel sheet angles extend longitudinally and are aligned to form a peripheral groove in the central transverse portion of the rubber body. The ends of the tubular steel core 17 extend from each end of the vulcanized rubber body 18.

Referring to FIGS. 5–9, the assembly in accordance with the invention formed by the round tubular core 17, the vulcanized rubber body 18 and the steel sheet angle 19 is assembled by inserting the rubber body 18 into the interior of a square section sheath 22 made of sheet steel. A hexagonal block 21 or lug is welded on each end of the tubular steel core 17 for coupling with a tension arm 42 to tension the spring once installed in the suspension system as discussed hereinafter in greater detail. The steel sheath 22 includes a plurality of holes 24 in the central transverse section of two opposing faces, which coincide with the peripheral groove (not shown) formed by the steel angles 19 on the vulcanized rubber body 18. A bolt 25 extends through each hole 24 in the steel sheath 22 to engage the rubber body 18 and prevent displacement in any direction between the exterior square sheath 22 and the vulcanized rubber body 18, allowing only the rubber to twist on applying loads to the round tubular core 17 due to the weight of the bus and the road surface.

As illustrated in FIGS. 5 and 6, the hexagonal blocks 21 located on the ends of the tubular shaft 17 of the square torsion spring assembly 16 allow coupling of adjustment levers 40. The adjustment levers 40 are connected with the adjusting tension bars 42 extending to mounting bases 43 that are anchored to the structural cross members of the bus body. The adjustable tension bars 42 enable tension adjustments when the rubber body 18 of the torsion spring assembly 16 so requires, displacing the position of the adjustment levers 40 and the angular position of the shaft 17 and hexagonal block 21 extending from the ends of the spring assembly 16.

A frame assembly 20 is coupled to the torsion spring assembly 16 and comprises a trapezoidal element made of high resistance sheet steel. A first end of the frame assembly is shaped to complement the square steel sheath 22 of the torque spring assembly 16 as best shown in FIG. 7. The torque spring assembly 16 is fastened to the frame assembly 20 by the lower frame support 30 by means of screws, bolts or other appropriate means to clamp the square spring assembly 16 to the frame assembly 20. The lower frame support 30 comprises an angle shaped fastening element made of high resistance steel plate having transverse reinforcement gusset plates 31 extending downwardly from the lower face of the support 30. The lower frame support 30 is fastened to the frame assembly 20 via screws, firmly clamping the torque spring assembly 16 to support the loads transmitted by the bus and the road variations, communicating them to the torque spring assembly 16.

The frame assembly 20 has a trunnion 53 welded on a transverse second end on which a yoke element 50 is mounted. The yoke 50 is fastened to the frame assembly 20 by a castellated type nut 54. This arrangement of the frame assembly 20 and the frame support 30, allows easy assembly, maintenance and replacement of the parts and eliminates the welding previously used in the suspension design using a round torsion spring. Preferably the lower frame 30 is removably coupled to the frame 20 to allow easy replacement of the spring assembly 16.

The adjustment levers 40 are elements in the form of a lever made of high resistance cast steel having a hexagonal formed cavity 41 to removably couple the adjustment levers 40 without welding to the hexagonal block 21 arranged on the ends of the tubular shaft 17 of the torque spring assembly 16. This characteristic permits the assembly and disassembly of the adjustment levers 40 from the tubular shaft 17 without damaging the rubber body 18.

In preferred embodiments of the assembly shown in FIGS. 5–7, the blocks 21 are hexagonal shaped and the aperture 41 in the adjustment levers 40 are also hexagonal. The blocks 21 may, however, be any polygonal shape, such as, for example, square, which will prevent rotation of the adjusting arm 40 with respect to the blocks 21. The aperture 41 in the adjustment levers 40 is shaped to complement the blocks 21.

The adjustment levers 40 allow the tension of the rubber torque spring body 18 to be adjusted by adjusting the angular position of the tubular shaft 17 with respect to the vehicle frame. The adjustment levers 40 include an eyelet 44 on one end coupled to the adjustment tension adjusting bars 42. The tension bars 42 are coupled to respective mounting bases 43 which are firmly anchored to the structural cross members of the vehicle. The tension bars 42 preferably have a threaded end for receiving the adjusting nuts 45. As shown in FIG. 7, the tension bars 42 extend through a collar which is coupled to the eyelet 44 by bolt means with the nuts 45 disposed on opposite ends of the collar. As shown in FIGS. 6 and 7, by adjustment of the nuts 45 on the threaded tension bars 42, the angular position of the adjustment levers 40 and the shaft 17 is adjusted in either a clockwise or counter-clockwise direction. Since the shaft 17 forms the pivot coupling of the wheel to the vehicle frame, the height of the vehicle frame with respect to the ground can be adjusted.

The yoke 50, which is firmly fastened to the trunnion 53 of the frame assembly 20 and 30, is made of high impact-resistance cast steel. The yoke further includes an extension 51 on its lower end with a conical hole 55 for receiving a conical bolt 52 with threaded ends to fasten a shock absorber element 120. On the upper part of the yoke 50 are two spaced-apart symmetrical extensions 56. The lower end of a vertical arm 70 is connected to the extensions 56 by means of a bolt 60 to produce the joint C as shown in FIG. 7. Joint C is the pivot point where the vertical and lateral loads and movements of the bus intersect and are absorbed by the square torque spring assembly 16 to achieve comfort in the suspension.

Figure 8:
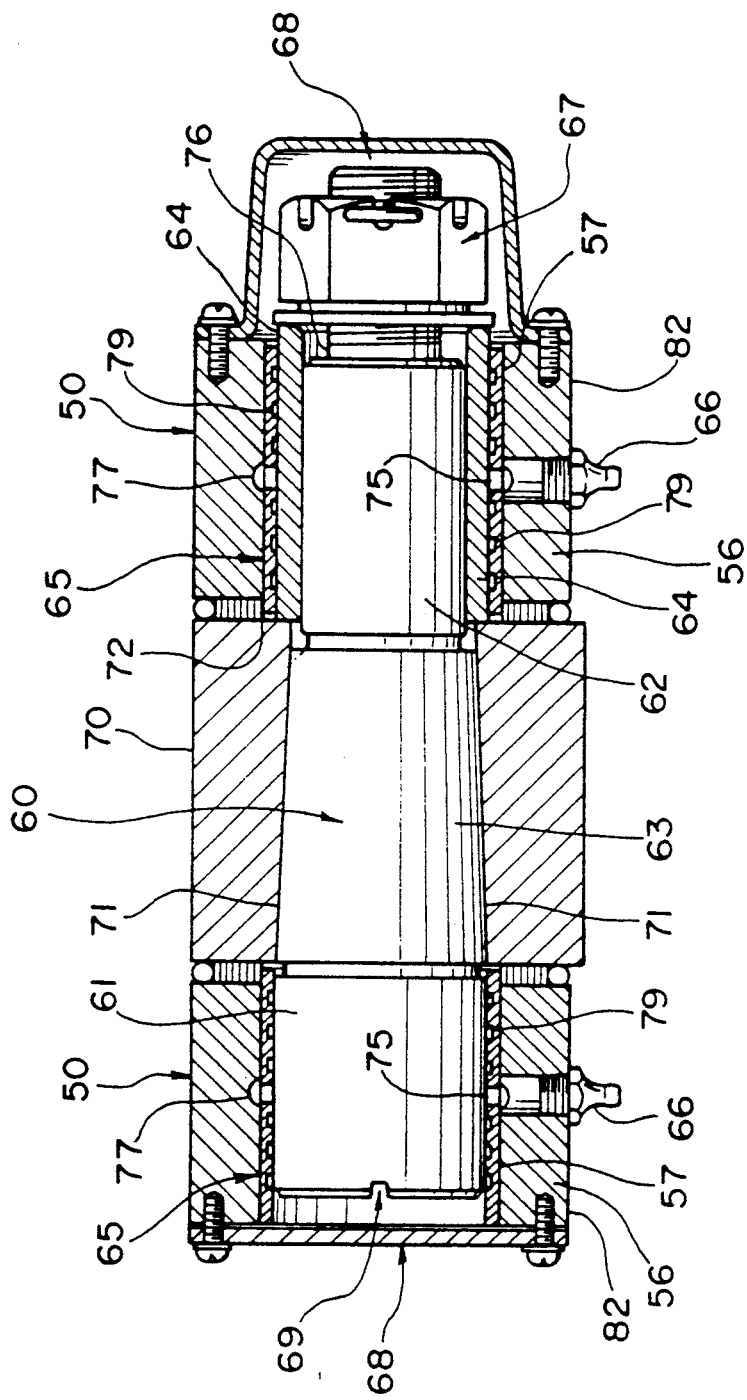
FIG. 8 is a sectioned, detailed view of joint C where the yoke and the joint of the arm interconnect by means of a bolt in accordance with one aspect of the invention.

FIG. 8 shows in enlarged detail the specific nature of the coupling between the yoke 50 and the lower end of the arm 70 using the bolt 60. The threaded bolt 60 allows easy maintenance and lubrication of the joint, thereby increasing the useful life of the components.

The upper symmetrical extensions 56 of the yoke 50 each include a transverse aperture 57 to receive a cylindrical bushing 65. As illustrated in FIG. 8, the aperture 57 in each of the extensions 56 of the yoke 50 are coaxially aligned and are substantially the same inner diameter. The main bushings 65 are pressed into the apertures 57 in a conventional manner. The bushings 65 include an internal spiral groove 79 to distribute grease along the bearing surface to reduce premature wear and tear due to friction between the bushings 65 and the moving parts. Lubrication of the bushing is by means of grease cups 66 in the extension arms 56 of yoke 50 placed transversely in the middle part of the bushings 65, thereby ensuring appropriate lubrication between the bushings 65. As shown in FIG. 8, the bushings 65 include an aperture 75 to communicate the grease cup 66 with the inner surface of the bushings 65.

The bolt 60 is mounted in the aperture of the extensions and fastened on one end by a castellated nut 67. Dust caps 68 are installed at both ends of the joint to ensure permanent lubrication by sealing the pivot coupling, thus eliminating premature wear and tear of the parts by not allowing the lubricant to leak or dust or any other undesirable material to enter.

As best shown in FIG. 8, the bolt 60 has a cylindrical first end 61 dimensioned to fit within the bushing 65 and a cylindrical second end 62 having a diameter less than the first end 61. The second end 62 of the bolt 60 further includes a threaded portion 76 to receive the nut 67. A middle section 63 of the bolt 60 has a frusto-conical shape converging toward the second end 62. The lower end of arm 70 has a conical bore 71 to receive the conical middle portion 63 of the bolt 60 as shown in FIG. 8.

An inner bushing 64 is disposed within the aperture of one of the extensions 56 as shown in the right hand side of FIG. 8. The inner bushing 64 is in the form of a cylinder and has an outer diameter complementing the inner surface of the bushing 65 and an inner diameter complementing the outer diameter of the second cylindrical end 62 of the bolt 60. The inner bushing has a length such that when assembled, a first end of the bushing 65 engages the side face 72 of the arm 70 while the opposite end extends from the aperture 57 beyond the bushing 64.

The bolt 60 which forms an essential part of the interconnection of elements partially shown in FIGS. 7 and 8 is a bolt made of high tension and impact-resistent steel. The threaded bolt receives the nut 67 whereby the assembly is secured via interference of bolt 60, with the inner bushing 64 and the conical bore 71 of the arm 70. The bolt 60 and the arm 70 have conical machined central portions for mating with each other. To facilitate simple, quick assembly and disassembly of the yoke 50, the bolt 60 and the arm 70, a notch 69 is disposed on the unthreaded end of bolt 60 such that the nut 67 can be removed while preventing rotation of the bolt by insertion of a suitable tool in the notch 69.

The inner bushing 64 has a cylindrical form, made of special tempered steel, rectified in the interior and exterior diameters, and positioned in the bushing 65. As illustrated, the end of the bushing 64 engages the side edge 72 of the arm 70 to draw the conical portion 63 of the bolt 60 firmly in contact with the conical surface 71 of the arm 70 by tightening the bolt 67 against the bushing 64. In the assembled condition illustrated in FIG. 8, the bolt 60 is tightly clamped to the arm 70 such that the arm 70, the bolt 60 and the inner bushing 64 pivot as a unit with respect to the yoke 50. Thus, pivoting movement between the arm 70 and the yoke 50 occurs between the inner bushing 65 and the bushing 64 at the second end of the bolt 60 and between the first end 61 of the bolt and the bushing 65.

The bushings 65 are pressure inserted in the yoke seats. The bushings 65 can be inserted from either side of the seats. In one embodiment, the inner surface of the bore 57, the yoke 50 includes an annular groove 77 communicating with the grease cup 66 to provide lubrication around the annular surface of the bushing 65. During installation, the lubrication parts in the bushing should be aligned with the annular groove 77 in the bore 71 of the yoke. The arrangement of the bushings 65 and the annular groove 77 ensure correct lubrication of bolt 60, the interior bushings 64 and the bushing 65 regardless of position between any of the holes 75 of bushing 65 and that of the grease cup 66.

The arm 70 includes an upper joint eyelet 73 on the upper end thereof and a central transverse eyelet made of tempered, high resistance cast steel. The upper eyelet 73 couples the arm 70 to the upper control arm 80, forming joint B as shown in FIG. 7. An eccentric bolt 78 with the eccentric lobes joining the arm 70 with control arm 80 allows adjustment changes in camber and caster of the steering. The eccentric bolt is mounted on threaded bushings that are fixed to the arm 80 by means of transverse screws as known in the art. A central eyelet (not shown) is coupled to the trunnion 74 of the wheel and a king bolt to which the steering commands are connected.

In the lower end of arm 70 coupled with yoke 50 to form joint C, constitutes the point where the loads and movements transmitted to the square spring assembly 16 are concentrated, and therefore the design has been calculated to allow supporting such loads and movement to which such joint is exposed.

The upper control arm 80, comprises a substantially "H"-shaped piece having a pair of eyelets 82 on a first end and a second pair of eyelets 83 on a second end to allow articulating the suspension. The eyelets 82 are coupled with arm 70 to form joint B, as shown in FIGS. 6–8. The eyelets 83 at the other end of the upper control arm 80 are coupled to torque bushings 100 which couple the upper control arm 80 to the frame to form joint A. Joint A constitutes the point where part of the bus load is transmitted onto the suspension. The control arm 80 is coupled to the torque bushings 100 by bolts that ensure a rigid assembly.

The control arm 80 has a machined flat lower surface 82 for mounting a rubber butt 81 by two bolts passing through a pair of holes (not shown) in the lower surface 82. Nuts are threaded onto the bolts to maintain the butt 81 in position. The arm 80 and the rubber butt 81, limit the downward movement of the frame when the bus is in a deep pothole, so that its displacement is no greater than a predetermined limit. Preferably the upper control arm 80 is built of high resistance cast steel and has high impact absorbing properties.

The eyelets 83 of the upper control arm 80 which form part of joint A are each connected with a respective rubber torque bushing 100. The rubber torque bushings 100 comprise a center steel shaft 101 having grooves aligned on one of its ends and a rubber, cylindrical body 102 firmly vulcanized to the shaft 101 to provide high torque resistance. The periphery of the rubber body 102 includes two steel sheet casings 103 adhered to the rubber. At least one of the casings is preferably provided with reinforcements. As illustrated in the side view, the casing 103 includes two flanges 104 extending outwardly for mounting the torque bushing to a support 90.

The torque bushings 100 isolate the vibration from the wheels to the body and allows movement of the arm 80 with respect to the vehicle frame. The bushings 100 absorb vibration in all directions, eliminate noises and provide improved comfort to the side of the vehicle. The rubber body 102 of the bushings 100 is vulcanized on the shaft 101 and the casing 103 to eliminate rubbing of metal parts, thus increasing the life of the assembly.

Figure 9:
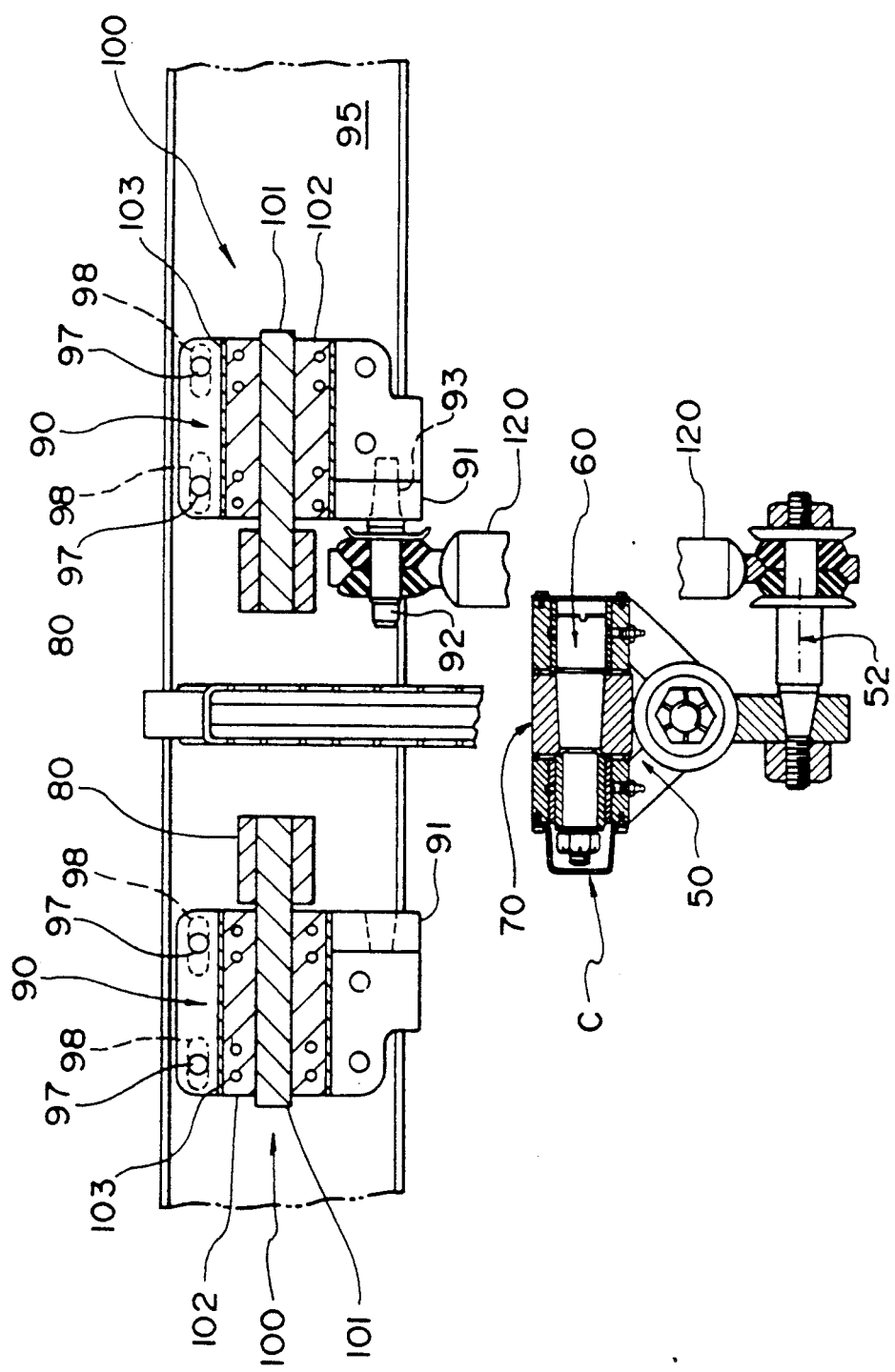
FIG. 9 is a representative view of a partial cross section taken along line 9—9 of the assembly illustrated in FIG. 7.

The casing 103 of the torque bushing 100 is coupled to the rail 95 of the vehicle frame by a support 90. The support 90 is coupled to the rail 95 by a plurality of bolts 97 extending through holes in the support 90 and the rail 95. Each flange 104 of the casing 103 is coupled to the support 90 by bolts 105 extending through holes in the flanges 104 and the support 90 as shown in FIG. 7. The support 90 includes a lower extension 91 having a conical bore 93 to receive an upper bolt 92 of a shock absorber 120. The bolt 92 is fastened by means of a self-locking type nut. The lower end of shock absorber 120 is coupled to the extension 51 of the yoke 50 by the bolt 52 as shown in FIG. 9.

The supports 90 are used to adjust the slope of the bolt 60 to define the original adjustment elevations of the steering, by adjusting the position of the supports 90 on the side rail 95 of the frame. Steel plates 96 having threaded holes are installed in the internal part of the side rails 95 as shown in FIG. 7. Oval holes 98 in the side rail 95 allow adjustment of the supports 90 backwards or forwards, as required for adjusting the caster. The fixing of the supports 90 to the plates 96 is done with bolts 97. The plates 96 may be welded to the side rails, once the caster is adjusted, to fix the suspension in the appropriate position.

Figure 10:
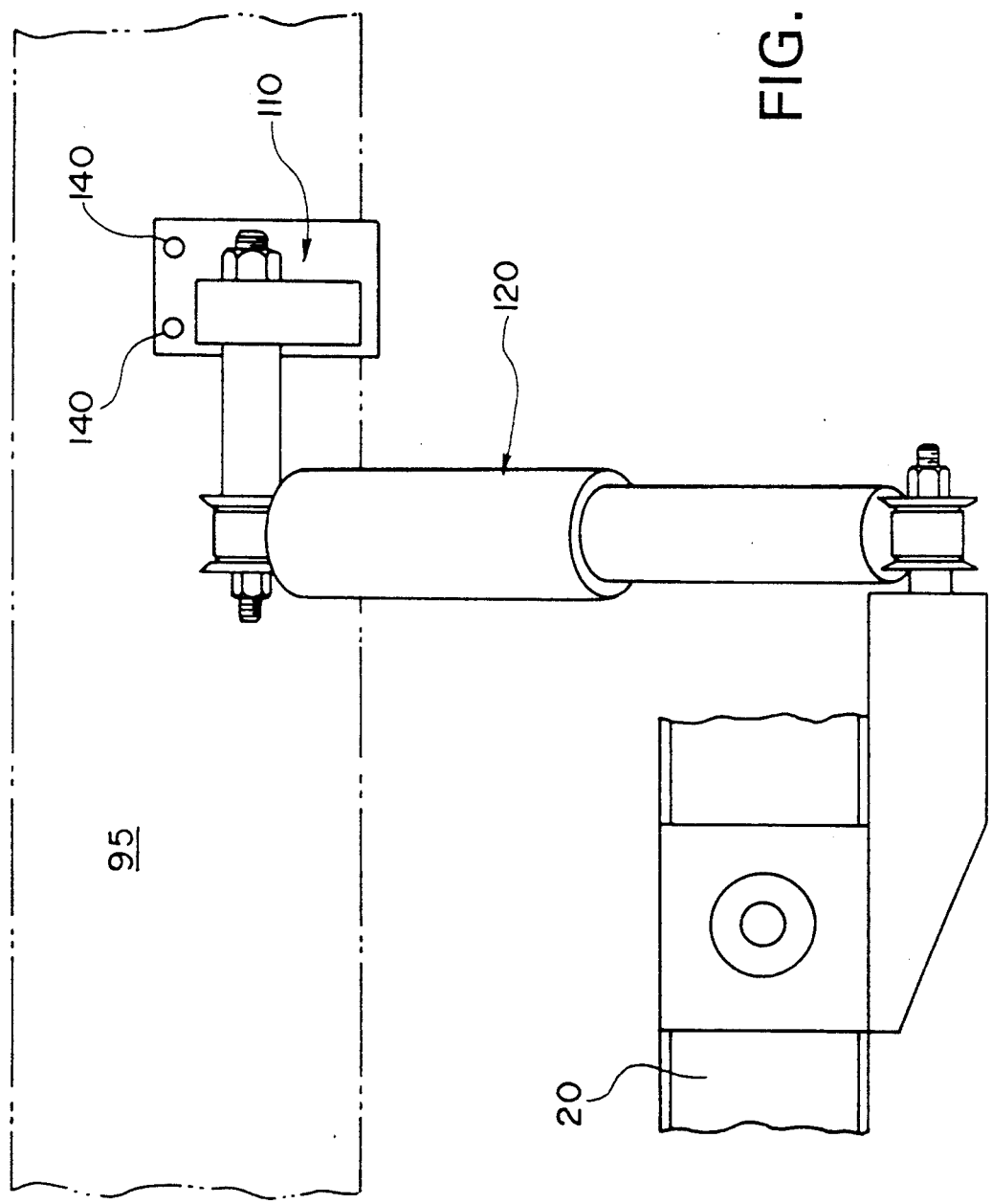
FIG. 10 is a partial detail of the mounting of the additional shock absorber of the new suspension.

As shown in FIG. 10, the improved suspension here described also incorporates an additional shock absorber 120 on each side of the suspension to enhance the shock absorbing system. A support element 110 comprising an angle with four holes and an outwardly extending plate where the shock absorber support bolt is fixed by means of a conical hole in the support. The support element 110 is fixed to the frame of the bus by bolts that extend through the holes of the support 140. Nuts are threaded onto the end of the bolts. The support 110 is preferably made of high resistance steel plate and the angle and plate are joined by welding.

The shock absorbers used for this suspension, are the double action, telescopic, heavy duty type. Each has a conical eyelet in each end in which rubber bushings are inserted for vibration absorption. The shock absorber is fastened by the upper part to the supports 90 and 110, and on the lower part it is connected with the yoke, as illustrated in FIG. 7. The lower part of the auxiliary shock absorber 120 is illustrated in FIG. 10. As shown, the fastening of this shock absorber on the lower end is to the frame assembly 20.

Preferably the shock absorbers are coupled to the suspension assembly by bolts to provide easy replacement of the shock absorbers. The bolts are preferably the same length and diameter so as to be interchangeable.

A support 130 for the upper butt 125 extends from the rail 95, which is a high resistance structural steel piece to restrict the upward movement of the suspension to avoid the wheel hitting or rubbing the fender. The upper butt 125 limits the slope of the body when the bus takes a high speed curve. In addition, the support 130 also acts as a limit for downward movement of the suspension when the butt 81 provided on the control arm 80 hits the upper surface of the support 130. The support 130 is welded to the chassis forming a high security, rigid union that allows it to resist impacts.

With the purpose of explaining the technical details of the improved suspension, it is noted that the above description has been made taking into account only one of the two sides of the vehicle which is symmetrically complemented on the opposite side. It will also be obvious to an expert in this field that even though the detailed description is referred to the suitable embodiment of such suspension, some variations on it can be made without departing from the inventive concept of the suspension here claimed, and that therefore, they must be considered in order to form part of the scope of the protection of the patent applied for.

Having described the invention, the contents of the following claims are claimed as property.

What is claimed is:

1. An independent front suspension assembly for vehicles comprising:
   a lower frame support pivotally coupled to a vehicle frame at a first end of said frame support;
   a yoke coupled to a second end of said frame support;

a vertical arm pivotally coupled to said yoke at a lower end of said vertical arm;

an upper control arm pivotally coupled at a first end to an upper end of said vertical arm and pivotally coupled at a second end to said vehicle frame;

a torsion spring assembly coupling said first end of said lower frame support to said vehicle frame, comprising an inner tubular shaft, a rubber torsion spring body fixed to an outer face of said tubular shaft and spaced from ends of said shaft, an outer sheath having a substantially square cross section fixed to said spring body, a hexagonal lug fixed to each end of said tubular shaft, a removable tension adjustment lever removably coupled to each of said lugs, said outer sheath being clamped to said first end of said tubular frame support, and said tubular shaft being pivotally coupled to said vehicle frame, and an adjustable tension bar coupled to said adjustment lever and to said vehicle frame to adjust the angular position of said tubular shaft with respect to said vehicle frame;

said yoke having a pair of spaced apart arms extending from an upper end of the yoke, each of said arms having a transverse aperture coaxially aligned, said lower end of said vertical arm having a conical aperture therein and being disposed between said arms of said yoke, bolt means extending through said apertures in said arms of said yoke and said conical aperture in said vertical arm, said bolt means having first and second cylindrical end sections complementing an inner surface of each aperture in said arms of said yoke and a conical shaped section disposed between said first and second sections complementing said conical aperture in said vertical arm, said first cylindrical section of said bolt having a diameter larger than a diameter of said second cylindrical section;

said yoke further comprising a lower extension;

shock absorber means having a lower end coupled to said extension of said yoke and an upper end coupled to said frame;

said second end of said upper control arm being coupled to a rubber torsion bushing, said rubber torsion bushing comprising a central shaft, a vulcanized rubber torsion body fixed to said shaft, and an outer casing fixed to said rubber torsion body and being fixed to said vehicle frame.

2. The front suspension assembly in accordance with claim 1, further comprising
a first bushing disposed in each aperture of the upper arms of the yoke, said bushings having an inner spiral groove and a transverse orifice for lubricating said bushing.

3. The front suspension assembly in accordance with claim 2, further comprising
at least one second inner bushing concentric with said first bushing of the yoke to contact said bolt means.

4. The front suspension assembly in accordance with claim 3,
said bolt means having a threaded first end to receive a nut, said nut engaging an end of said second inner bushing;
said bolt having a groove in a second end to allow quick assembly and disassembly of said bolt from said yoke, and vertical arm.

5. The front suspension assembly in accordance with claim 2, further comprising grease cup means for each of the said first bushings, each grease cup being located transverse to a middle part of said first bushing.

6. The front suspension assembly in accordance with claim 5, wherein
said transverse orifice in a middle portion of said first bushings coincides with an internal annular groove in said apertures in said yoke, said groove coinciding with said grease cup means.

7. The front suspension assembly in accordance with claim 1, further comprising
dust cap means on an open end of said apertures in said yoke to prevent leakage of lubricant and the entrance of dust.

8. The front suspension assembly in accordance with claim 1,
said torsion bushings being coupled to a support, said support being coupled to said vehicle frame and having an extension means with a conical hole for receiving bolt means for coupling to said shock absorber.

9. The front suspension assembly in accordance with claim 1,
said torsion bushings being coupled to a support on said frame, said support including holes coinciding with orifices in a mounting plate on an opposite side of said frame for receiving mounting bolts to fix said support to said vehicle frame.

10. The front suspension assembly in accordance with claim 9,
said mounting plate being positioned on an interior part of said vehicle frame, said vehicle frame including oval holes receiving said mounting bolts for fastening said torsion bushing to said vehicle frame.

11. The front suspension assembly in accordance with claim 10,
said oval holes in said frame being positioned to allow adjustment of the torsion bushing backwards or forwards with respect to said vehicle frame to adjust the caster of said suspension assembly.

12. The front suspension assembly in accordance with claim 1, further comprising
a second shock absorber means having an upper end coupled to said vehicle frame and a lower end coupled to an extension on said lower frame of said torsion spring assembly.

13. The front suspension assembly in accordance with claim 12,
said upper end of said second shock absorber means being coupled to a support having a conical hole receiving an end of a bolt.

14. An independent front suspension assembly for vehicles comprising
a lower frame support pivotally coupled to a vehicle frame at a first end of said frame support;
a yoke coupled to a second end of said frame support;
a vertical arm having an upper and lower end, said lower end being pivotally coupled to said yoke;
an upper control arm having first and second ends, said first end being pivotally coupled to said upper end of said vertical arm and said second end being pivotally coupled to said frame;
a torsion spring assembly coupling said first end of said lower frame support to said vehicle frame, comprising an inner tubular shaft, a rubber torsion spring body fixed to an outer face of said tubular shaft and spaced from ends of said shaft, an outer sheath having a substantially square cross section fixed to said spring body, lug means fixed to each end of said tubular shaft, a removable tension adjustment lever removably coupled to each of said lug means, said outer sheath being coupled to said first end of said frame support, and said tubular shaft being pivotally coupled to said vehicle frame, and an adjustable tension bar coupled to said adjustment lever and to said vehicle frame to adjust the angular position of said tubular shaft with respect to said vehicle frame;

said yoke having a pair of spaced-apart arms extending from said upper end of the yoke, each of said arms having a transverse, coaxially aligned bore, each bore in each of said arms having substantially the same inner diameter, said lower end of said vertical arm having a transverse conical bore therein and being disposed between said arms of said yoke, bolt means extending through said bore in said arms of said yoke and said conical bore in said vertical arm, said bolt means having first and second cylindrical end sections complementing an inner surface of each bore in said arms of said yoke, and a conical shaped middle section disposed between said first and second sections complementing said conical bore in said vertical arm, said first cylindrical section of said bolt having a diameter larger than a diameter of said second cylindrical section.

15. The suspension assembly in accordance with claim 14, further comprising first bushing means disposed in each bore of said arms, each of said first bushing means being substantially the same dimensions;

inner bushing means disposed within at least one of said first bushing means, said inner bushing means having an outer dimension complementing an inner dimension of said first bushing means and an inner dimension complementing said second cylindrical section of said bolt means, said inner bushing means having a first axial face contacting a side face of said vertical arm surrounding said bore in said vertical arm, and a second end extending axially from an axial end of said first bushing means.

16. The suspension assembly according to claim 15, said bolt means having a threaded portion at said second end; and threaded nut means removably coupled to said threaded end and having an axial face engaging said second end of said inner bushing means.

17. An independent front suspension assembly for vehicles comprising a lower frame support pivotally coupled to a vehicle frame at a first end of said frame support, a yoke coupled to a second end of said frame support, a vertical arm having an upper and lower end, said lower end being pivotally coupled to said yoke, an upper control arm having first and second ends, said first end being pivotally coupled to said upper end of said vertical arm and said second end being pivotally coupled to said frame, a torsion spring assembly coupling said first end of said lower frame support to said vehicle frame, comprising an inner tubular shaft, a rubber torsion spring body fixed to an outer face of said tubular shaft and spaced from ends of said shaft, an outer sheath having a substantially square cross section fixed to said spring body, lug means fixed to each end of said tubular shaft, a removable tension adjustment lever removably coupled to each of said lug means, said outer sheath being coupled to said first end of said frame support, and said tubular shaft being pivotally coupled to said vehicle frame, and an adjustable tension bar coupled to said adjustment lever and to said vehicle frame to adjust the angular position of said tubular shaft with respect to said vehicle frame, a torsion bushing comprising a central shaft, a rubber torsion body fixed to said shaft, and an outer casing fixed to said rubber torsion body, said shaft being coupled to said upper control arm, and said outer casing being coupled to said vehicle frame.

18. The suspension assembly according to claim 17, further comprising support means coupled to said vehicle frame; and first and second flanges extending radially from said outer casing, each flange including a pair of bolt-receiving holes and being coupled to said support means.

* * * * *